July 9, 1935. F. W. HARRIS 2,007,426
AUTOMATIC STORAGE TYPE WATER HEATER WITH CONCENTRIC SHELLS
Filed Nov. 18, 1933
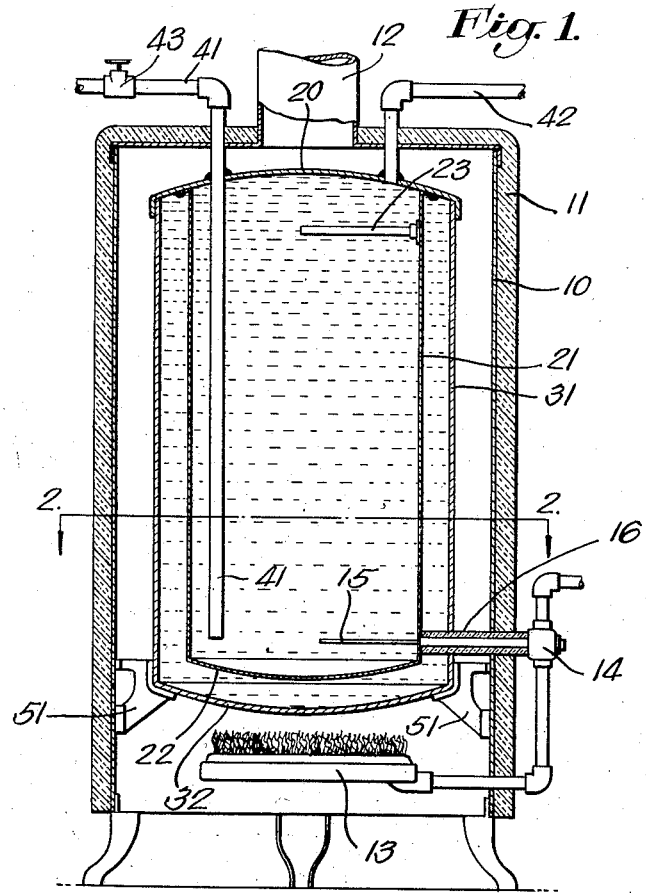
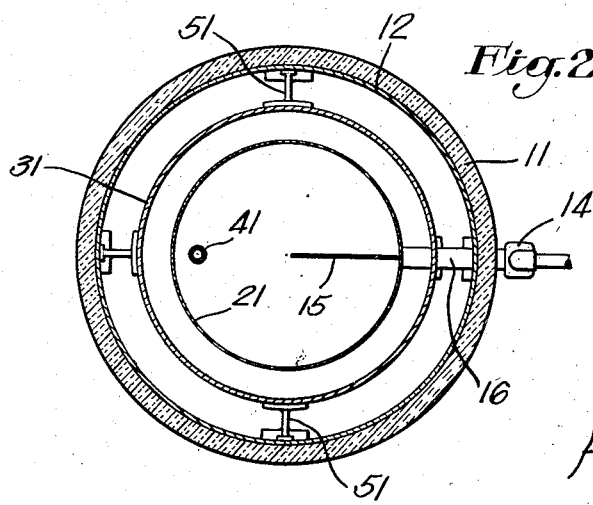
INVENTOR
FORD W. HARRIS Patented July 9, 1935

2,007,426

UNITED STATES PATENT OFFICE 2,007,426

AUTOMATIC STORAGE TYPE WATER HEATER WITH CONCENTRIC SHELLS

Ford W. Harris, Los Angeles, Calif., assignor to Patco, Inc., Los Angeles, Calif., a corporation of California Application November 18, 1933, Serial No. 698,681

4 Claims. (Cl. 122—32)

My invention relates to water heaters and particularly to the so-called automatic storage water heaters in which a considerable body of hot water is stored at all times, this hot water being drawn upon as needed and replaced with cold water which is then automatically heated to the desired temperature.

My invention further relates to heaters of this type which are particularly adapted to be used in connection with water which contains considerable quantities of various salts, particularly the calcium salts. In the ordinary type of storage water heater which is in general use throughout the United States the water is carried in a service water chamber which is surrounded by metal walls and which is heated by the application of heat to the outer surfaces of these walls, this heat being transmitted through the metal of the walls to the water to be heated. Heat is ordinarily supplied by the products of combustion from a gas burner and since the temperature of these combustion products is ordinarily quite high, local ebullition takes place on the inner surface of the heated walls. Due to this ebullition the salts carried in the water tend to deposit on the inner side of these heated walls, forming a coating or scale which interferes with heat transmission and very rapidly cuts down the efficiency of the heater. It has been proposed by various inventors to manufacture heaters of the indirect type in which a body of dead water is interposed between the heating surfaces exposed to direct contact with the combustion products and the service water which it is desired to use.

It is a further object of my invention to provide a simple and inexpensive automatic storage water heater of the indirect type.

Further objects and advantages of the invention will be made evident hereinafter.

Referring to the drawing, which is for illustrative purposes only, Fig. 1 is a vertical section through a heater embodying my invention. Fig. 2 is a section on a plane represented by the line 2—2 of Fig. 1.

In the form of the invention shown I provide a shell 10 which is preferably of metal and which is surrounded by suitable heat insulation 11, the upper portion of this shell communicating with a flue 12 leading to the chimney.

The space inside the shell is hereinafter called a combustion space. In the lower part of this combustion space I place an oil or gas burner 13 which is controlled by a suitable thermostatic valve 14 having a thermostatic element 15 which projects through suitable heat insulating walls 16 into the service water space hereinafter defined.

I provide a comparatively heavy top 20 to which is secured by welding an inner cylindrical member 21 which is provided with an upper bottom 22, the member 21 being so joined to the top 20 and to the bottom 22 that it forms a water-tight space. The members 21 and 22 may, however, be made of light galvanized material or even thin brass or copper since they are not called upon at any time to withstand any hydraulic pressure.

A small relief pipe 23 extends inwardly from one side of the wall 21 and provides open communication between the service water space enclosed by the members 20, 21, and 22, and a dead water space which surrounds the members 21 and 22.

I also secure to the top 20 a heavy cylindrical metal member 31 to which is secured a lower bottom 32, the top 20, the member 31 and the bottom 32 being secured together so as to be water-tight and being so constructed that they have a suitable factor of safety to withstand the service water pressure with which the heater may be used. Service water is delivered to the bottom of the service water space through a pipe 41 and the hot water is withdrawn from the top of the service water space through a pipe 42. A valve 43 is preferably placed in the pipe 41. A suitable pilot valve, not shown, is provided for the burner 13.

The complete assembly consisting of the members 20 to 32 is supported on suitable castings 51 attached to the member 10.

The heater is put in service as follows: The parts being assembled as shown in the drawing and the pipe 42 being connected to the pipe through which it is desired to deliver hot water, the valve 43 is opened and any valves which may be in the pipes to which the pipe 42 is connected are opened so that all air is expelled from the heater. Cold water runs into the dead water space through the pipe 23, completely filling same. If now the valves are closed in the pipes to which the pipe 42 is connected, the heater is filled with water, ordinary service water filling both the service water space and the dead water space. If now the pilot is lighted and the gas is turned on, the gas burner 13 produces products of combustion directly below the lower bottom 32, these products of combustion flowing upwardly between the walls 10 and 31 and being conducted away through the flue 12. The thermostatic valve is so set that this valve remains open until the water in the bottom of the service water space reaches a predetermined temperature, which is preferably considerably below the atmospheric boiling point of water.

The hot products of combustion in contact with the bottom 32 and member 31 give up heat to these members, this heat being transmitted through the metal and given up to the dead water in contact with the inner surface thereof. Convection currents are then set up in this water and this water in turn gives up heat to the member 21 and bottom 22, this heat being transmitted to the service water in the service space. As a result, the water in the service space is rapidly heated until its temperature reaches the point at which the thermostatic valve is set, the thermostatic valve then closing and shutting off the gas from the burner 13. If at any time hot water is desired, it is removed from the top of the service water space through the pipe 42 and the volume of hot water so withdrawn is replaced by cold water delivered to the bottom of the service water space through the pipe 41. As soon as considerable hot water has been withdrawn from the heater, the cold water surrounds the thermostatic element 15, the thermostatic valve 14 is opened, and the water is again heated until the water surrounding the thermostatic element 15 is at the desired temperature.

It will be noted that the dead water space and the service water space are always in open communication with each other through the pipe 23 and that there is no tendency for any convection currents to be set up which would tend to cause any great interchange of water between the dead water space and the service water space. Some interchange takes place due to the expansion and contraction of the water in these two spaces but this interchange is comparatively small so that the water in the dead water space remains in the heater for a considerable period.

If the service water contains large amounts of soluble salts, some of these salts are deposited from the dead water in the heater, first starting at the surfaces at which local ebullition takes place; that is to say, the inner surface of the lower bottom 32 and the lower portion of the member 31. The amount of these salts carried in the volume of water carried in the dead water space is very small and the scale so produced is so very slight that it does not affect the heat transfer efficiency of the surfaces upon which it is deposited. As soon as the salts initially in the dead water are so deposited, these salts are exhausted and additional salts can only find their way into the dead water by the exchange of water between the dead water space and the service water space. Since this exchange is very small in volume, the amount of salts finding its way into the dead water space is very small and the concentration of salts in the dead water is very low. As a result, scale forms very slowly and the heater will operate for a long period without material deposition on the heating surfaces. No ebullition can take place on the inner surface of the service water space due to the fact that since the dead water space and the service water space are at all times in open communication with each other, the pressure in these spaces always equalizes, and the member 21 and the bottom 22 are never subjected to any unequalized pressure. This enables me to make the member 21 and the bottom 22 of very thin material, which facilitates heat transfer between the dead water and the service water.

If for any reason water in the dead water space should boil, which ordinarily does not take place if the apparatus is properly proportioned, this pressure relieves itself through the pipe 23, the maximum pressure which can ever be obtained in the dead water space with the valve 43 open being the service water pressure.

I claim as my invention:

1. In a water heater, the combination of: walls forming an inner shell with gas-tight ends surrounding a service water space; walls forming an outer shell with gas-tight ends, said outer shell partially surrounding said inner shell, the space between said shells forming a dead water space in communication with said service water space through an opening in said inner shell positioned near the upper end thereof and so placed that there is very little tendency for water to move from one space to the other due to convection currents, but pressure is at all times free to equalize between said spaces; and means for applying direct heat to the outer walls of said outer shell.

2. In a water heater, the combination of: walls forming an inner shell with gas-tight ends surrounding a service water space, the walls and lower end of said inner shell being made of thin metal incapable of withstanding the pressure of the water system to which it is applied; walls forming an outer shell with gas-tight ends, said outer shell surrounding the lower end and vertical walls of said inner shell, said outer shell being made of sufficiently heavy material to safely withstand the full pressure of said water system, the space between said shells forming a dead water space in communication with said service water space through an opening in the walls of said inner shell disposed near the upper end of said inner shell and so placed that there is very little tendency for water to move from one space to the other due to convection currents, but pressure is at all times free to equalize between said spaces, the water in said dead water space surrounding the sides and bottom of the water in said service water space; and means for applying direct heat to the outer walls of said outer shell.

3. In a water heater, the combination of: walls forming an inner shell with gas-tight upper and lower ends surrounding a service water space, the walls and lower end of said inner shell being made of thin metal incapable of withstanding the pressure of the water system to which it is applied, said walls having an opening therein near said upper end; walls forming an outer shell with gas-tight ends surrounding the lower end and vertical walls of said inner shell, said outer shell being made of sufficiently heavy material to safely withstand the full pressure of said water system, the space between said shells forming a dead water space; a hollow tubular member having an outer end communicating through said opening with said dead water space, and having an inner end projecting inwardly into said service water space and communicating therewith so that there is very little tendency for water to move from said service water space through said tubular member and into said dead water space due to convection currents, but pressure is at all times free to equalize between said spaces; and means for applying direct heat to the outer walls of said outer shell.

4. In a water heater, the combination of: walls forming an inner shell with gas-tight ends surrounding a service water space; walls forming an outer shell with gas-tight ends, said outer shell cooperating with said inner shell to form a dead water space in communication with said service water space through an opening in said inner shell positioned near the upper end thereof and so placed that there is very little tendency for water to move from one space to the other due to convection currents, but pressure is at all times free to equalize between said spaces; and means for applying direct heat to the outer walls of said outer shell.

FORD W. HARRIS.